United States Patent [19]

Koontz

[11] 3,997,316
[45] Dec. 14, 1976

[54] USE OF CROSSED ELECTRODE PAIRS IN A GLASSMAKING FURNACE

[75] Inventor: Harry S. Koontz, Pittsburgh, Pa.
[73] Assignee: PPG Industries, Inc., Pittsburgh, Pa.
[22] Filed: Jan. 19, 1976
[21] Appl. No.: 650,388
[52] U.S. Cl. .................................. 65/136; 65/337; 65/347; 13/6; 65/DIG. 4
[51] Int. Cl.² ........................................ C03B 5/02
[58] Field of Search ....... 65/337, 347, 136, DIG. 4; 13/6

[56] References Cited

UNITED STATES PATENTS

| | | | |
|---|---|---|---|
| 1,905,534 | 4/1933 | Wadman | 65/347 X |
| 2,993,079 | 7/1961 | Augsburger | 13/6 |
| 3,440,321 | 4/1969 | Gell et al. | 13/6 |
| 3,520,979 | 7/1970 | Scarfe et al. | 13/6 |
| 3,583,861 | 6/1971 | Preston | 65/347 X |
| 3,742,111 | 6/1973 | Pieper | 13/6 |
| 3,852,509 | 12/1974 | Rutledge et al. | 13/6 |

*Primary Examiner*—Arthur D. Kellogg
*Attorney, Agent, or Firm*—E. Kears Pollock

[57] ABSTRACT

A vertically elongated glassmaking furnace is provided with two groups of electrodes: one group comprises crossed pairs of electrodes positioned in the upper portion of the furnace and is operated to melt glass batch and to establish an upward flow of hot glass along the center of the furnace; a second group is positioned in the lower portion of the furnace and operated to slow the downward flow of molten glass through the furnace, particularly near the walls of the furnace so that all the molten glass in the lower portion of the furnace flows uniformly downwardly to discharge at a rate sufficiently slow to insure the upward escape of seeds or bubbles from the discharged glass. The crossed pairs of electrodes are energized in such a way as to provide intersecting lines of current flow with the loci of intersection in the vicinity of the central vertical axis of the furnace.

3 Claims, 2 Drawing Figures

USE OF CROSSED ELECTRODE PAIRS IN A GLASSMAKING FURNACE

BACKGROUND OF THE INVENTION

This invention relates to the making of glass. More particularly, it relates to an improved method of melting and refining glass in a vertically elongated electric melting furnace.

Vertically elongated glass melting furnaces have peripheral heating electrodes have been known in the art of glass making for many years. Illustrative of the state of the art are the following references: U.S. Pats. Nos. 2,186,718 to Ferguson, 2,263,549 to Peyches, 3,524,206 to Boettner et al., 3,583,861 to Preston, 3,725,588 to t'Serstevens, 3,742,111 to Pieper and 3,755,606 to Boettner et al. and in several foreign patents Swedish Pat. No. 80,130, Italian Pat. No. 298,239, German (W) Pat. No. 736,937 and French Pat. No. 1,305,805.

The patents of Peyches, Boettner et al. and Preston show side-mounted electrodes at a plurality of elevations to heat molten glass in the illustrated furnaces and to heat and melt glass batch materials floating on the molten glass by radiation and convection through the molten glass and conduction from it to the unmelted batch materials. In Boettner et al. U.S. Pat. No. 3,524,206 the heat energy applied to a furnace at any given elevation is greater than the heat energy applied at any lower elevation. In Preston the heat energy applied at a lower elevation of a furnace is sufficient to create an upward or countercirculation of glass particularly at the periphery of the furnace so that the downward flow of glass from an upper portion at a higher elevation of the furnace is nullified. The patent of Boettner et al. includes a scheme for increasing contact between unmelted batch and molten glass by encouraging the bottom surface of the floating glass batch to assume a conical shape similar to the depressed shape shown in U.S. Pat. No. 2,397,852 to Gentil. The German patent shows outwardly-tapered side walls near the top of a furnace, and the patent of Preston illustrates inwardly tapered side walls near the bottom of a furnace.

Crossfiring electrodes have been considered in the past for use in melting glass. The following references disclose plural electrode arrangements and the use of multiphase electric power to provide intersecting electric current paths through molten glass. High current densities at the current path intersections remote from the electrodes themselves result in hot spots at those locations of high current densities as described in these references.

U.S. Pats. Nos. 2,018,883, 2,018,884 and 2,018,885 of Ferguson all describe crossed electrode pairs in shallow dish-like furnaces for directing electric currents along intersecting paths across the furnaces. U.S. Pat. No. 2,018,883 is directed to an electric furnace having means for passing a plurality of independent electric currents through its contents along diametrical paths wherein the furnace is deeper at its center than about its periphery. U.S. Pat. No. 2,018,884 is directed to a similar furnace having means to pressurize the interior of the furnace and thereby control the flow of molten glass therefrom. U.S. Pat. No. 2,018,885 is directed to a similar furnace further having means for applying magnetic forces across the electric currents directed through it.

U.S. Pat. Nos. 2,984,829 and 2,993,079 of Augsburger describe glassmaking furnaces provided with heating electrodes to direct electric currents along intersecting paths through molten glass contained in them. The described furnaces appear to be relatively shallow compared with their horizontal dimensions.

U.S. Pat. No. 3,852,509 of Rutledge et al. describes a vertically elongated furnace having a plurality of electrodes about its periphery. Opposing electrodes, both diametrically opposing and peripherally opposing, are energized together to direct electric currents through molten glass in the furnace. Electric current path intersections occur, not only at the center of the furnace, but about the whole furnace including near its periphery and between its center and periphery.

All of these patents describing crossfiring electrodes describe the use of electric transformers to yield the requisite number of currents of differing phases to accommodate the particular number of electrodes employed in each scheme.

While the glassmaking furnaces described in the prior art are all apparently useful for the melting of glass batch to prepare molten glass, the vertically elongated glassmaking furnaces of the past with their heating electrodes are not believed to be as thermally efficient as desired, nor to refine molten glass sufficiently to provide for the making of high-quality flat glass. It is an objective now to provide an improved method of operation for vertically elongated, electrically heated glassmaking furnaces and to provide certain improvements to such furnaces themselves.

SUMMARY OF THE INVENTION

A vertically elongated, electrically heated glassmaking furnace having a height generally greater than its inside width is provided with an upper portion for receiving batch materials, a main portion for melting and refining glass having at least two groups of electrodes at different elevations extending into it through its side walls and a lower portion for discharging glass for forming.

The furnace has a cross-sectional shape (in plan) which is circular or regular polygonal, preferably an octagon (eight-sided). The walls of the furnace are constructed of refractory materials which are held together and supported by a steel framework external to the furnace. The upper portion is preferably an outwardly flared portion with its side walls extending outwardly to provide an upper width at an elevation of an intended glass line of at least about 1.2 times the width of the main portion of the furnace. It flares outwardly at an angle from the vertical of from 15° to 45°, preferably about 30°, from the vertical. The inside of the furnace near the bottom is preferably tapered inwardly to a central discharge so that the flow of molten glass to discharge leaves a thermally symmetric environment in the furnace.

The first group of electrodes may comprise one or two sets of electrodes. The electrodes are provided about the periphery of the furnace just below its upper batch receiving section. The electrodes are arranged in crossed pairs which are powered to provide intersecting current lines which cause the establishment of a hot spot in the center of the furnace. This is accomplished by Joule heating the molten glass preferentially where the electric current density is greatest at the center of the furnace where independent current paths intersect. These electrodes are operated to provide a vigorous upward flow of molten glass in the center of the furnace. This rising cylinder of molten glass moves upwardly along the central axis of the furnace then divides in the vicinity of an overlying layer of unmelted glass batch in the wider, upper portion of the furnace. The glass flow continues as a plurality of outwardly moving radial flows which turn downwardly near the side walls. After turning downwardly, the glass flows inwardly if a flared upper section is provided and then directly downwardly in conformance to the shape of the inside of the furnace.

As the molten glass flows downwardly along the vertical walls of the furnace, it is engaged by the second group of electrodes comprising a plurality of peripherally mounted electrodes which are energized in a manner to provide a controlled amount of heat to the molten glass about the periphery of the furnace. Care is taken to avoid supplying so much heat as to cause a counterflow of molten glass upwardly along the periphery of the furnace for such upward flow would continue as an inward flow to the center of the furnace and downwardly from there as a canalized flow to the bottom discharge of the furnace. By the proper adjustment of heat introduced about the periphery of the furnace, it has been found that molten glass flow in the bottom of the furnace can be made to flow uniformly downwardly throughout the whole cross section of the bottom portion of the furnace. This results in a uniformly, refined stream of molten glass to be discharged from the furnace.

With the power properly applied to the lower group of electrodes, the maximum downwardly velocity of molten glass in the lower portion of the furnace is about the same as the terminal rise velocity for a gas bubble (0.5 mm diameter) through the molten glass as estimated, using the well-known Stokes law for the rise of buoyant elements through fluids.

This invention may be further appreciated with reference to the drawings accompanying this disclosure.

DESCRIPTION OF THE PREFERRED EMBODIMENTS

Figure 1:
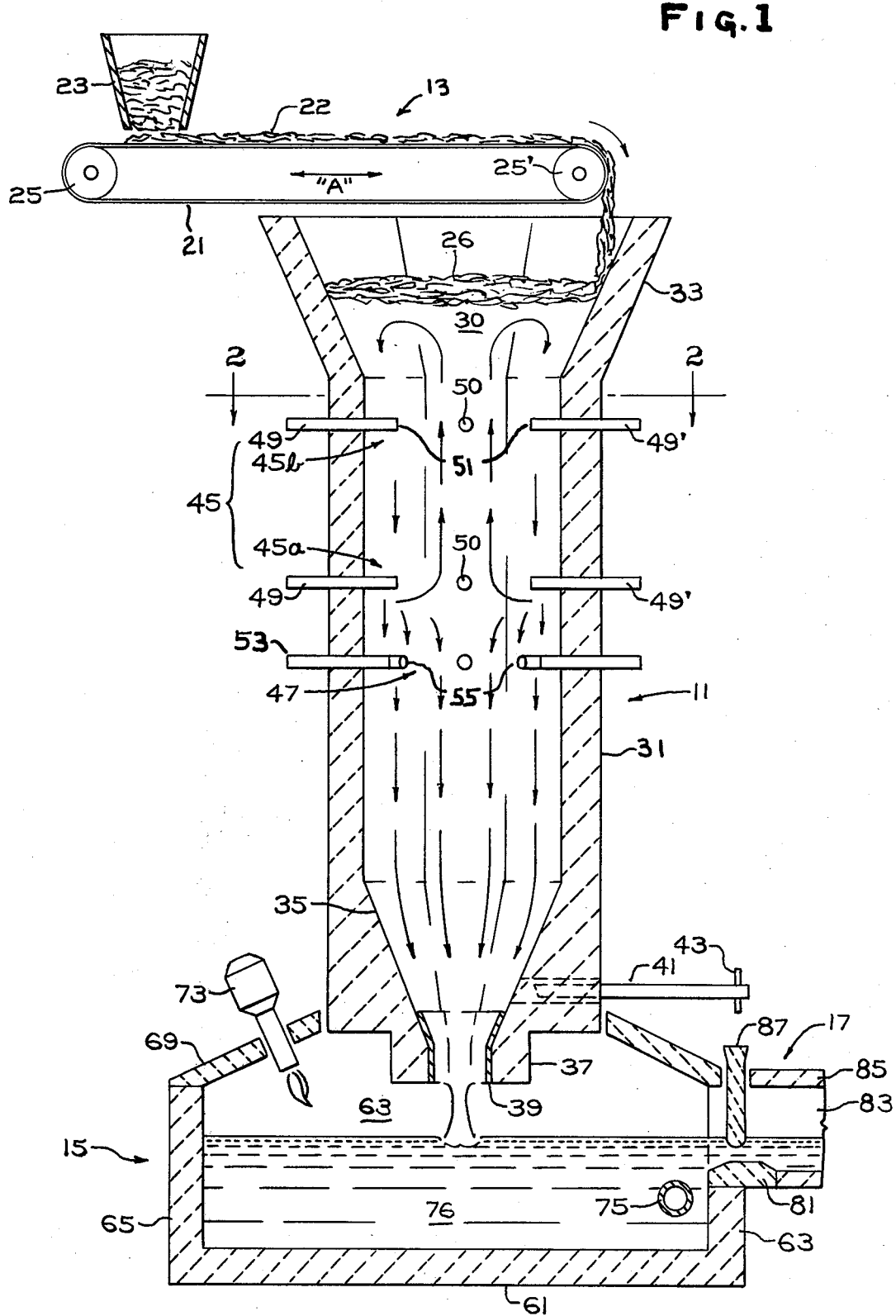
FIG. 1 is a schematic sectional elevation view of a glassmaking furnace embodying the principles of this invention.
Figure 2:
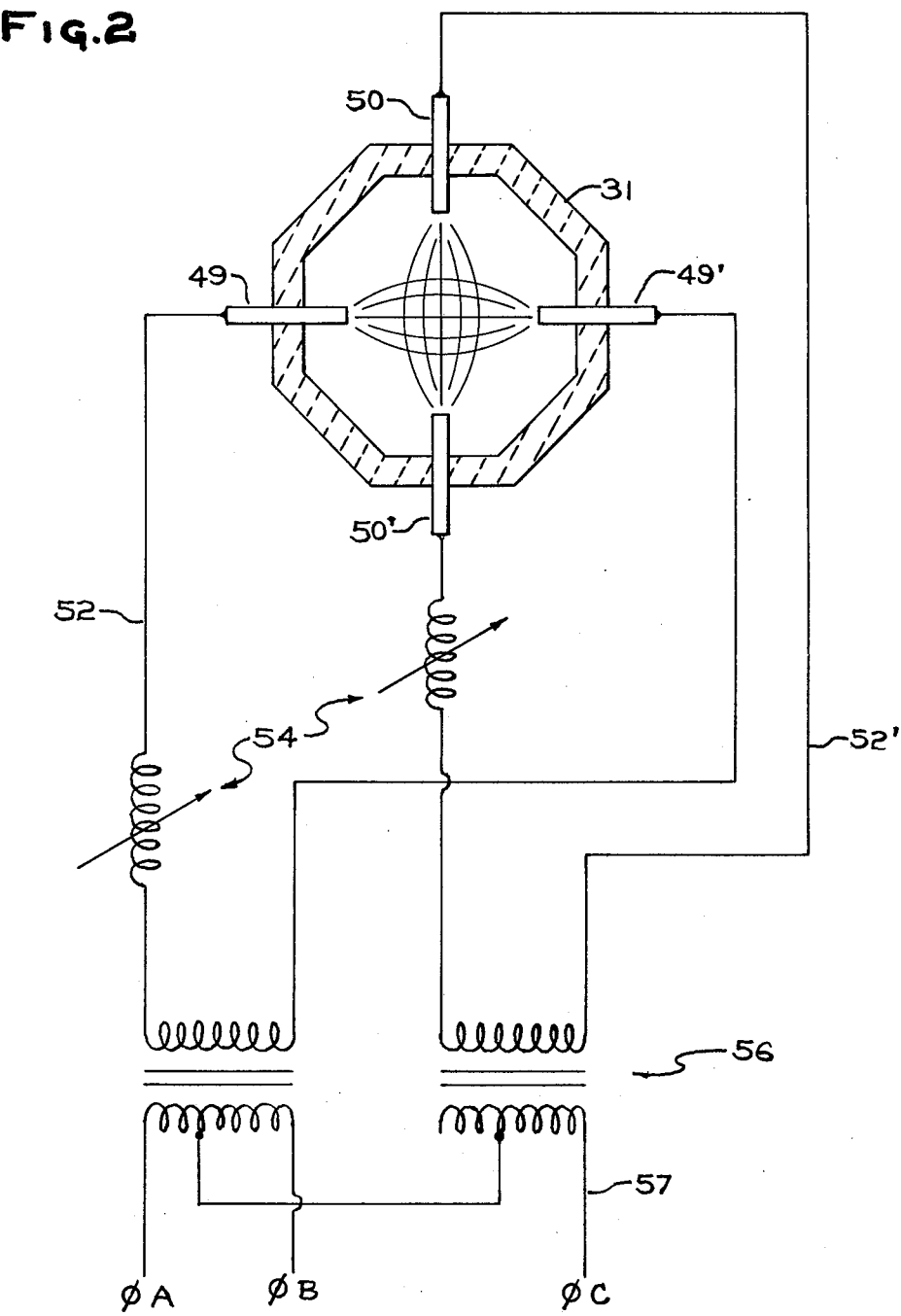
FIG. 2 is a schematic sectional plan view of the glassmaking furnace of FIG. 1 taken along section line 2—2.

Referring now to FIGS. 1 and 2, there is shown a glassmaking facility which is designed and operated according to this invention. A vertically elongated melting furnace 11 is provided with an apparatus 13 for feeding or charging glass batch materials, including cullet if desired, to it. The facility further includes a molten glass conditioner 15 and a glass delivery facility 17 for discharging molten glass to a forming system, such as a drawing machine, a rolling machine or a forming chamber containing molten metal upon which a continuous sheet of flat glass may be formed.

The batch feeding apparatus may be any conventional, or otherwise convenient, device for feeding particulate, caked, pelletized or briqueted glass batch materials. A bucket conveyer, vibratory feeder or belt 21 (as shown) may be employed. The belt 21 is fed with batch 22 from a hopper 23 and is mounted on driving and driven rolls 25, 25' which, in turn, may be mounted on a translatable carriage (not shown) to move the belt assembly back and forth as shown by double-headed arrow A. Such movement insures that there is maintained at the top of the furnace a continuous layer of batch 26 over a pool or column of molten glass 30 within the furnace 11. This continuous layer of batch 26 serves to thermally insulate the molten glass 30 from the cooler outside environment above it.

The furnace 11 comprises vertical side walls 31 forming a generally cylindrical or polygonal shape (a preferred eight-sided furnace is shown). These walls 31 and the remainder of the furnace are supported by external structural steel work or other conventional supports (not shown). The upper portion of the furnace 11 has outwardly flared walls 33 to provide a larger batch 26—glass 30 interface than would be possible were the width of the furnace to be maintained at the top as between side walls 31. The combination of the outwardly flared walls 33 and the generally vertical side walls is effective to provide for flowing molten glass near the walls 31 and 33 to have a longer path length between given elevations than the path length for glass flow along the central axis of the furnace. This helps to slow downward peripheral flows as will be discussed below.

The bottom portion of the furnace 11 has a funnel-like inner wall 35 terminating in a nozzle 37 which is preferably lined with a liner 39 or corrosion- and erosion-resistant material, such as fused cast silica, molybdenum or platinum. Preferably, the bottom portion of the furnace includes a device 41 for closing the entrance to the nozzle 37. This may be a cooled plate having connectors 43 for connection to a source of coolant such as water.

Extending into the furnace 11 through its side walls 31 are at least two groups, 45 and 47, of heating electrodes. The upper group 45 of electrodes may include electrode sets 45a and 45b at a plurality of elevations as shown.

The upper group 45 of electrodes comprises two sets 45a and 45b of four electrodes 49 and 50 each. The four electrodes of each set comprise two independent pairs having intersecting current paths. One pair is indicated as 49 and 49' and the other as 50 and 50' in FIG. 2. The electrode pairs 49 and 50 of sets 45a and 45b are energized by connection through conductors 52 and 52', respectively, having controlled variable reluctance 54 to a Scott transformer 56 which, in turn, is connected through conductors 57 to a source of three-phase electric power. The heat generated in the glass is generated primarily in a central core of glass about the center axis of the furnace as the intersecting single-phase current paths of electrode pairs 49 and 50 intersect at the center of the furnace.

The lower group 47 of electrodes comprises a single set or eight electrodes 53. These electrodes are positioned so their interior tips 55 lie in a circle having its center at the center axis of the furnace and having a radius of from three-eighths to about nine-twentieths of the width of the furnace. Thus, the tips 55 of electrodes 53 are even with or outside of the tips 51 of electrodes 49. This arrangement greatly assists in controlling the flow of molten glass in the furnace. These electrodes 53 are connected in sequential sub-groups of three to a source of three-phase electric power. When energized, the electrodes generate heat in the molten glass close to the side walls 31 of the furnace. By adjusting the power to these electrodes 53 the molten glass flowing downwardly along the side walls 31 is slowed and directed slightly inwardly. Below the electrodes 53 molten glass flows uniformly downwardly throughout the whole cross section of the lower portion of the furnace.

The described glassmaking furnace preferably has an inside height (including the bottom tapered funnel and the top flared portion) up to a desired molten glass surface that is from three to five times the inside width of the furnace. The lower group of electrodes is preferably near the midsection of the furnace but, in any event, is sufficiently spaced from its lower discharge to permit the flow of glass below these electrodes to be substantially unhindered (thermally or mechanically) for a distance at least equal to the width of the furnace. The upper group of electrodes should have at least one set closely spaced above the lower group of electrodes. If the upper and lower groups of electrodes are too widely spaced from one another, the lower group is more likely to induce an undesired circulation flow of its own, rather than serving to slow the downward flow induced by the heating from the upper group. The upper group of electrodes should have a set of electrodes less than half the width of the furnace above the lower group of electrodes.

The conditioner 15 is a substantially enclosed vessel comprising a refractory bottom 61, side walls 63, end walls 65 and 67 and cover tile or flat arch roof sections 69, 71. The conditioner is preferably provided with a burner 73 or other heating means, such as a resistance heater, to adjust and maintain the temperature of molten glass delivered to the conditioner 15. Also, it is desirable to provide one or more coolers 75 in the conditioner 15 to adjust and maintain the temperature of molten glass in it. In a preferred embodiment the horizontal length of walls 63 is greater than the length of walls 65 and 67 and a horizontally elongated pool of molten glass 76 is established in the conditioner 15. The cooler 75 is submerged in the pool of molten glass 76, and its cooling effect, along with the heating effect of heater 73, causes glass in the conditioner to flow uniformly toward its discharge end wall 67.

The glass delivery facility 17 may be the kiln of a drawing machine, the canal of a float unit, the forehearth of a fiber bushing or of a bottle machine but in the preferred embodiment is a threshold delivery facility for the direct, substantially horizontal delivery of a layer of molten glass onto molten metal in an attached forming chamber. The facility includes a threshold 81, jamb blocks 83, a roof cover 85 and a metering member 87.

Soda-lime-silica glass comprising from 65 to 80 percent silica may be melted and refined in the manner described here. The furnace is started by first closing the bottom nozzle by inserting cooled plate 41. Cullet is placed in the lower portion of the furnace and, while the elecrodes are retracted so their tips are closely adjacent the walls 31 of the furnace, a portable gas or oil burner is lowered into the furnace just above the cullet in the bottom of the furnace. This burner is fired to melt the cullet and is gradually raised as additional cullet is added to the furnace. When the burner has been raised out of the furnace and the top surface of the molten glass produced by melting the cullet has risen above the uppermost set of electrodes, the electrodes are inserted inwardly to their operating positions and power is applied to them. The burner is then removed completely and cullet is fed to the furnace until the top surface of the molten glass rises into the upper, flared section of the furnace to its desired level. Then the desired batch-cullet mixture is charged to the furnace to maintain the level of molten glass in it as the cooled plate 41 is withdrawn and molten glass permitted to flow from the furnace.

While the furnace is being initially charged, the conditioner is also prepared for operation. Temporary, auxiliary burners are inserted through temporary openings made in the conditioner cover plates 69 and 71. Cullet is charged to the conditioner through temporary openings in the cover plates as the auxiliary burners are fired so that the conditioner is loaded with molten glass when the furnace is ready for delivering molten glass to it.

Once the furnace has been started, the power applied to the groups of electrodes is adjusted until the above-described flows are established. Flows may be detected by submerging a buoyant refractory ball into the furnace at various depths and horizontal positions and releasing it. The elapsed time until surfacing and the location of surfacing are noted. By subtracting the Stokes rise (calculated) velocity from that measured for the actual rise time, the glass flow (drag) velocity effect may be determined.

In order to establish a proper circuit design for operating the crossed electrode pairs near the upper portion of the described furnace, the following matters are considered to be significant. On the basis of a model design for the portion of a furnace having only two crossed electrode pairs at one elevation and having no lower perimeter electrodes, the power to heat molten glass and establish upward glass flow at the furnace center is estimated. The furnace segment design comprises a refractory-walled furnace with interior walls having a plan shape of a regular octagon and an outer wall shaped as a cylinder. The interior face-to-face width is 42 inches (1.08 meters) and the wall thickness at the faces is 21 inches (0.54 meter).

Four electrodes extend into the furnace through the walls to an insertion depth of 12 inches (0.30 meter). The electrodes are arranged as two opposed pairs with one pair at right angles to the other (in plan view). The electrodes are cylindrical, each having a diameter of 4 inches (0.10 meter). In this proposed design of a furnace segment the glass depth is to be 60 inches (1.5 meters) and the electrodes are to be located at a common elevation, 14 inches (0.36 meter) below the intended glass line.

Glass is to be maintained on a molten state in the furnace segment with an intended center temperature of about 2800° F (1510° C) between the electrodes, a wall temperature at that elevation of about 2600° F (1430° C) and an intended bottom center temperature of about 2450° F. The furnace segment is to be designed for discharging molten glass from the bottom at a rate of about 4 tons per day (4064 kilograms).

With such design criteria a suitable electrical system may be designed and it is believed that similar systems may be designed in a similar manner for a complete furnace as described or for a vertical furnace of any convenient size. A Scott transformer is employed to convert ordinary three-phase power to two equal power outputs 90° out of phase with each other. Power from one leg of the transformer is applied to one pair of electrodes and power from the other leg to the other pair of electrodes. Using an ordinary main line power of 435 volts to a Scott transformer having a 600:120 winding ratio with the input winding taps at 50 percent and 86 percent, respectively, it is possible to apply a voltage of 87 volts across each pair of electrodes while passing 1180 amperes through each pair. Such a power density is believed satisfactory for achieving the thermal effects desired for the molten glass in the central core of the furnace when melting a typical soda-lime-silica glass.

When scaling up a furnace of the described design to a size adequate for producing molten glass in large amounts to feed a flat glass manufacturing process (on the order of 400 tons per day — $4.1 \times 10^5$ kilograms per day), it is possible to use two or more electrodes to act as single electrodes in each pair. Thus, several physically small electrodes may be connected in parallel to one side of one leg of a Scott transformer and they can act as one electrode so far as molten glass in a furnace is concerned. This kind of arrangement is effective for avoiding undesirable electrode resistance, overheating and burn-out. A suitable set of conditions for operating a large vertical furnace on the order of 30 feet high by 18 feet wide (9.13 meters × 5.5 meters) would be to impose a voltage of 860 volts across each pair (or plural electrodes acting as pairs) of electrodes with a current of 3500 amperes being directed through the central core of glass between opposing electrodes. A furnace operating at a power density of about 720 kilowatts per ton of glass produced is believed adequate for melting and refining glass for forming flat glass.

While this invention has been described with reference to particular embodiments of it, those skilled in the art will recognize that certain variations may be made without departing from the spirit of this invention or from the scope of the claims defining it.

I claim:

1. A furnace for melting and refining glass comprising
   a. a walled, vertically elongated chamber for holding molten glass having an uppermost portion for receiving glass batch materials, a major portion for melting and refining glass and a lowermost portion provided with a discharge opening, the chamber so shaped as to have a central vertical axis;
   b. means for charging glass batch materials to the chamber as a layer over substantially all of its uppermost portion at a rate sufficient to maintain a pool of molten glass in the chamber with a glass-batch interface in the uppermost portion;
   c. a first group of electrodes at a first elevation comprising two pairs of electrodes extending inwardly into the major portion of the chamber with the electrodes of each pair positioned in diametrically opposing relationship across the chamber and with pairs of electrodes displaced from one another such that a line joining the electrodes of one pair intersects normally a line joining the electrodes of the other pair at a locus of normal intersection substantially at the central vertical axis of the furnace wherein each electrode of each pair of electrodes is substantially smaller than the inside periphery of the chamber;
   d. means for providing electric power to each pair of electrodes of said first group of electrodes with the power applied to one pair being about 90° out of phase with the power applied to the other pair wherein the electrodes are connected to the electric power means for energizing the electrodes to heat molten glass at the central axis of the chamber for establishing an upward flow of glass therein only about the central axis of the chamber; and
   e. a second group of electrodes at a lower elevation in the major portion of the chamber than said first group of electrodes and extending into the furnace sufficiently for establishing electric current paths between adjacent electrodes about the periphery of the chamber providing means for directing electric currents through molten glass adjacent the walls of said chamber.

2. The apparatus according to claim 1 wherein the chamber has inside walls providing an octagonal inside shape and the electrodes extend into the chamber from the faces of the inside walls of the chamber with the electrodes at a common elevation.

3. A method of melting and refining glass in a vertically elongated furnace comprising the steps of
   a. charging glass batch materials as a layer onto the surface of a pool of molten glass maintained in the furnace;
   b. heating the molten glass of the pool of molten glass by directing two normally intersecting electric currents, each extending diametrically across the width of the pool of molten glass with the normally intersecting currents about 90° out of phase with one another while maintaining the orientation of the currents so that their region of intersection remains in a central portion of the pool of molten glass whereby the glass is heated in the central portion sufficiently to establish an upward flow of molten glass only in the central portion of the pool of molten glass;
   c. heating the molten glass of the pool of molten glass about a peripheral portion of the pool of molten glass at an elevation below that at which the molten glass in the central portion of the pool is heated, wherein said heating is sufficient to retard without reversing a downward flow of molten glass in the peripheral portion of the pool; and
   d. discharging a portion of the molten glass from a lower portion of the pool of molten glass for forming the discharged glass into flat glass.

\* \* \* \* \*